United States Patent
Ueda et al.

(10) Patent No.: US 6,978,404 B2
(45) Date of Patent: Dec. 20, 2005

(54) INFORMATION RECORDING DEVICE, INFORMATION RECORDING METHOD, AND PROGRAM

(75) Inventors: Hiroshi Ueda, Osaka (JP); Kenji Takauchi, Osaka (JP); Yoshitaka Mitsui, Osaka (JP); Motoshi Ito, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 312 days.

(21) Appl. No.: 10/240,557

(22) PCT Filed: Apr. 4, 2001

(86) PCT No.: PCT/JP01/02935

§ 371 (c)(1),
(2), (4) Date: Apr. 21, 2003

(87) PCT Pub. No.: WO01/75879

PCT Pub. Date: Oct. 11, 2001

(65) Prior Publication Data

US 2003/0156471 A1    Aug. 21, 2003

(30) Foreign Application Priority Data

Apr. 5, 2000 (JP) ............................. 2000-103032

(51) Int. Cl.[7] ............................ H03M 13/00; G11B 5/09
(52) U.S. Cl. ................................. 714/710; 369/47.14
(58) Field of Search ..................... 714/710, 711, 723, 714/758; 369/47.14, 53.21

(56) References Cited

U.S. PATENT DOCUMENTS 6,367,038 B1 *   4/2002   Ko ............................. 714/710
6,377,524 B1 *   4/2002   Ko ............................ 369/47.14

FOREIGN PATENT DOCUMENTS

| EP | 0 541 219 A1 | 12/1993 |
| JP | 07-235139 | 5/1995 |
| JP | 2000-040308 | 8/2000 |

* cited by examiner

*Primary Examiner*—Albert Decady
*Assistant Examiner*—James C. Kerveros
(74) *Attorney, Agent, or Firm*—Renner, Otto, Boisselle & Sklar, LLP

(57) ABSTRACT

An information recording apparatus 110 includes a defect list update section 122 for updating a defect list having a defect address registered therein which represents a position of a defect area existing in a user area, and a recording section 113 for recording information on the information recording medium 130 based on the updated defect list. The defect list update section 122 determines whether or not an area designated by the defect address registered in the defect list is a defect area; and when the area designated by the defect address is determined not to be a defect area, the defect list update section 122 deletes the defect address, registered in the defect list, from the defect list.

12 Claims, 7 Drawing Sheets

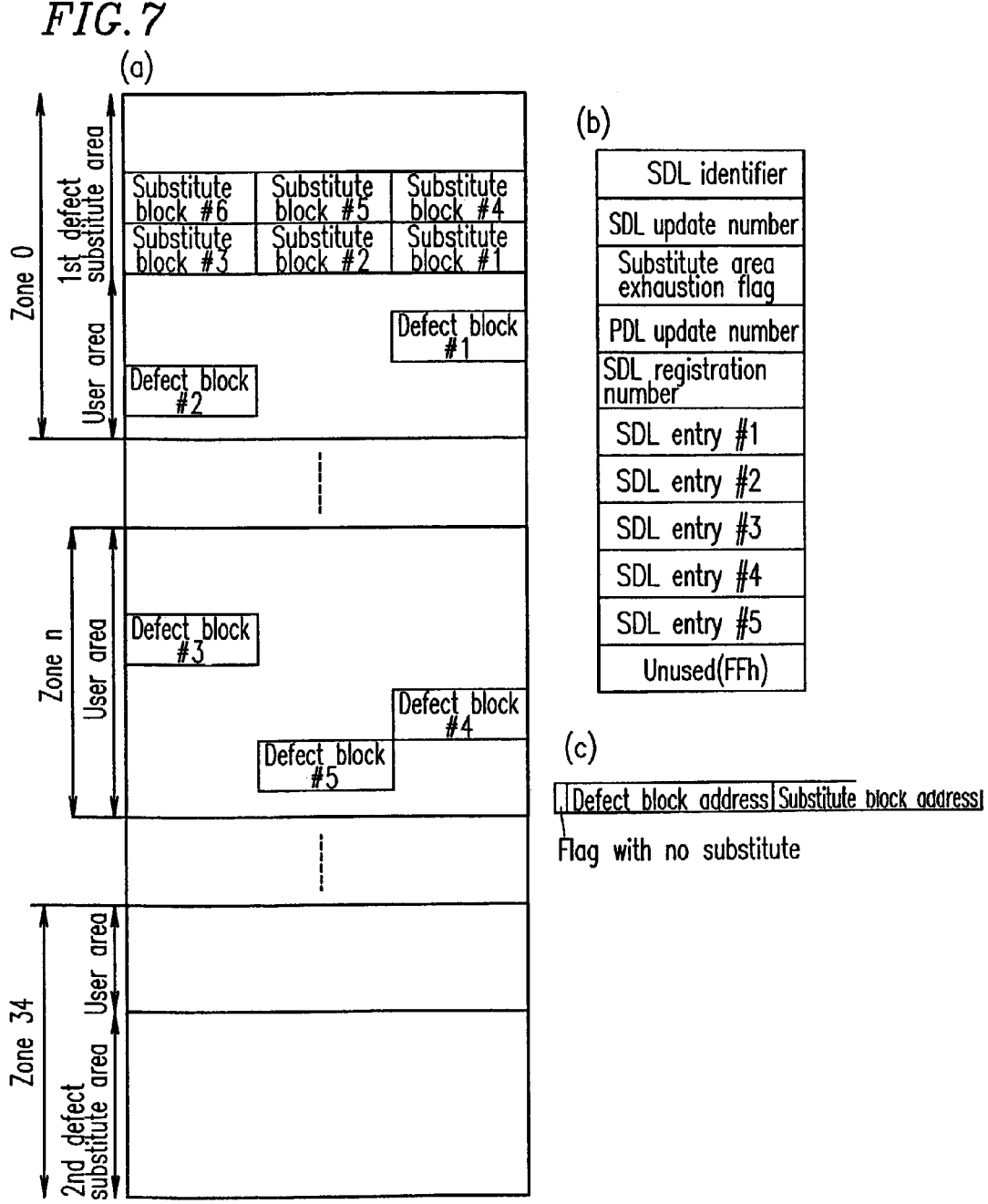

INFORMATION RECORDING DEVICE, INFORMATION RECORDING METHOD, AND PROGRAM

TECHNICAL FIELD

The present invention relates to an information recording apparatus and an information recording method for recording information on an information recording medium including a user area and a defect substitute area, and a program for causing the information recording apparatus to execute initialization processing for initializing the information recording medium.

BACKGROUND ART

Rewritable discs such as, for example, phase change type optical discs and magneto-optical discs, generally have data provided with an error correction code recorded thereon. Accordingly, even when a slight error is caused when reading data recorded on such optical disks, the error can be corrected and correct data can be read.

However, due to the environment or the period of time in which the disc is used, the material of the disc is deteriorated because of dust adhering to the disc, scratches caused to the disc, repeated recording, or the like. In an area of the optical disc where the material is deteriorated, an error of a level exceeding the error correction capability provided by the error correction code may occur. Such an area cannot be used for recording and reproduction of data from the view point of reliability of the disc. (Hereinafter, such an area will be referred to as a "defect area".)

A conventional rewritable disc generally has a reserve area for compensating for the defect area (hereinafter, such a reserve area will be referred to as a "defect substitute area"). When a defect area is detected while data is being recorded, a recording apparatus records the data, which was to be recorded in the defect area, in a normal area of the defect substitute area. Thus, the reliability of the data is guaranteed. Such processing is generally referred to as defect management processing. Defect management processing allows a rewritable disc to be treated as error-free.

Hereinafter, with reference to FIGS. 4 through 7, a conventional defect management method will be described with an example of a 4.7 GB DVD-RAM (Digital Versatile Disc-Random Access Memory).

FIG. 4 shows a data structure of a conventional rewritable disc. As shown in part (a) of FIG. 4, the disc includes a lead-in area, a data area, and a lead-out area.

The lead-in area includes a control data area, a test area, and two defect management areas. The control data area has concave and convex portions formed therein, and is not rewritable. In the control data area, control data referred to by a disc recording/reproduction apparatus, such as, for example, the type and physical parameters of the disc, is recorded. The test area is rewritable and is used for recording processing performed when the manufacturer of the disc confirms the quality before shipping or for recording processing performed when the recording apparatus adjusts the control parameters. The two defect management areas are both rewritable. In the two defect management areas, defect management information 1 and defect management information 2 are respectively recorded. Defect management information 1 and defect management information 2 have the same content. Defect management information 1 and defect management information 2 each include a content relying on the disc structure, such as the number of zones and the like and information regarding a defect area on the disc. The details of the contents of defect management information 1 and defect management information 2 will be described below with reference to part (b) of FIG. 4.

The data area is divided into 35 zones of zone 0 through zone 34. As shown in part (c) of FIG. 4, zone 0 includes a first defect substitute area including a substitute area usable instead of a defect area in a user area, and the user area for recording user data. Zone 0 through zone 33 each include a user area. As shown in part (d) of FIG. 4, zone 34 includes a user area and a second defect substitute area which can be additionally set. Herein, "can be additionally set" means that the presence/absence of a second defect substitute area and the size of the second defect substitute area can be set.

The lead-out area includes two defect management areas and a test area. In the two defect management areas, defect management information 3 and defect management information 4 are respectively recorded. The contents in defect management information 3 and defect management information 4 are the same as those of defect management information 1 and defect management information 2. The test area of the lead-out area is used for quality confirmation performed by the manufacturer of the disc and adjustment of the control parameters performed by the recording/reproduction apparatus.

Part (b) of FIG. 4 shows a data structure of the defect management information. The defect management information includes a medium definition structure (DDS; Disc Definition Structure), a primary defect list (PDL; Primary Defect List), and a secondary defect list (SDL; Secondary Defect List). In the DDS, information, such as the number of defect management groups of the disc (the number of pairs of a user area and a defect substitute area; the number is 1 in the case of a 4.7 GB DVD-RAM) and the number of times of update, is recorded. In the PDL, information on the position of a defect area detected at the time of physical formatting of the disc is recorded. In the SDL, information for managing a defect area detected after the physical formatting of the disc is recorded.

Part (e) of FIG. 4 shows a data structure of the PDL. A PDL identifier is a specific identification code for identifying a PDL (i.e., 0001h (h is a hexadecimal number)). A PDL registration number represents the number of pieces of registered defect position information which are positioned after the PDL registration number. In the example shown in part (e) of FIG. 4, the PDL registration number is m (m is a positive integer). A first defect PSN is a PSN (Physical Sector Number) of a sector which is detected as a defect at the time of physical formatting. Herein, a PSN is a one and only number assigned to each of sectors for identifying the sectors on the disc. An unused area of the PDL is filled with FFh data. The relationship between the defect area and the substitute area will be described below with reference to FIG. 6.

Part (f) of FIG. 4 shows a data structure of the SDL. An SDL identifier is a specific identification code for identifying an SDL (i.e., 0002 h (h is a hexadecimal number)). An SDL update number is the number of times that the SDL is updated. A start PSN of the second defect substitute area can be additionally set. A total logic block number is the number of blocks which can be used as a user area.

A substitute area exhaustion flag includes 1 bit which shows whether or not there is an empty area in the first defect substitute area, and 1 bit which shows whether or not there is an empty area in the second defect substitute area. Each bit is set to the value of 1 or 0. The value of 1 indicates that there is no empty area in the respective defect substitute area. The value of 0 indicates that there is an empty area in the respective defect substitute area.

A PDL update number is the number of times that the PDL is updated. The DDS and the PDL are updated simultaneously. Thus, the PDL update number is also the number of times that the DDS is updated.

An SDL registration number represents the number of pieces of registered defect position information which are positioned after the SDL registration number. In the example shown in part (f) of FIG. 4, the SDL registration number is n (n is a positive integer).

A first defect PSN is a PSN (Physical Sector Number) of a leading sector of the defect area registered in the SDL.

A first substitute PSN is a PSN of a leading sector of a substitute area (normal area) in the defect substitute area which substitutes for a defect area designated by the first defect PSN.

As described above, in the SDL, a PSN of a leading sector of a defect area (defect PSN) and a PSN of a leading sector of a substitute area therefor (substitute PSN) are registered as a pair. In the example shown in part (f) of FIG. 4, n number of pairs of defect PSNs and substitute PSNs are registered in the SDL, and are arranged in the order of PSN of the defect areas in ascending order. An unused area of the SDL is filled with FFh data. The relationship between the defect area and the substitute area will be described below with reference to FIG. 7.

Hereinafter, with reference to FIG. 5, an ECC (Error Correction Code) block used in a 4.7 GB DVD-RAM disc will be described. A minimum unit of the 4.7 GB DVD-RAM disc is a sector, but the data recording unit is an ECC block. An ECC block includes 16 sectors.

Part (a) of FIG. 5 shows a data structure of an ECC block recorded on the disc. In one sector, 12 user data lines (one user data line is equal to 172 bytes, and 1 byte is equal to 8 bits), 12 inner code lines (one inner code line is equal to 10 bytes), 1 outer code line (172 bytes), and 1 inner and outer code line (10 bytes) are recorded.

The above-mentioned data is converted into data having an ECC block structure shown in part (b) of FIG. 5 when the data is read from the disc. For reproducing data, first, the 12 user data lines and the 12 inner code lines are connected to each other. Then, a total of 16 outer code lines and a total of 16 inner codes lines which are arranged discretely, i.e., one outer code line and one inner code line to each sector, are connected to an end portion of the ECC block structure. An inner code line m (m is an integer of 0 through 11) is an error correction code attached to a user data line m, and is used for performing a correction in the lateral direction in part (b) of FIG. 5. The outer code lines are used for performing a correction in the longitudinal direction in the entire ECC block.

An inner and outer code is positioned in a portion where the lateral direction and the longitudinal direction are overlapped, and is used both for correcting an outer code line in the lateral direction and for correcting an inner code line in the longitudinal direction. For recording data, conversely, as shown in part (b) of FIG. 5, the apparatus first generates inner codes, outer codes and inner and outer codes corresponding to the user data lines. Then, the outer code lines and the inner and outer code lines are recorded, such that the outer code lines and the inner and outer code lines are distributed in the sectors.

As described above, in the case of a 4.7 GB DVD-RAM disc, generation of error correction codes and execution of error correction processing using the error correction codes cannot be performed sector by sector. Therefore, the unit for recording and reproducing data is an ECC block including 16 sectors. The registration of a defect area to the SDL described with reference to FIG. 4 is also performed in units of an ECC block.

Next, with reference to FIG. 6, a conventional defect management method of a defect area detected at the time of physical formatting will be described.

Part (a) of FIG. 6 shows exemplary defect areas detected in zone 0 and zone n (n is an integer of 0 through 34) at the time of physical formatting. At the time of physical formatting, recording is performed and then reproduction is performed zone by zone, so that a defect sector is detected as a defect area. The unit of recording and reproducing data is an ECC block including 16 sectors, but an error can be detected sector by sector, since error correction is performed only in the lateral direction at the time of data reproduction.

It is assumed that as shown in part (a) of FIG. 6, two defect sectors (defect sectors #1 and #2) are detected in zone 0 and three defect sectors (defect sectors #3, #4 and #5) are detected in zone n. In this case, PSNs are registered to the PDL as information representing the positions of these defect sectors.

In the case where defects are detected in two sectors in zone 0, an area which is not used for recording user data is formed at an end portion of zone 0. This area is referred to as a fraction. In the example shown in part (a) of FIG. 6, the number of sectors in the fraction is 14. The number of sectors in the fraction is adjusted such that the number of usable sectors in zone 0 is a multiple of the number of sectors included in one ECC block (i.e., 16).

Similarly, in the case where defects are detected in three sectors in zone n, a fraction including 13 sectors is formed at an end portion of zone n.

An area of the end portion of the first defect substitute area which is equal to the size of the user area reduced by defect sectors #1 through #5 (in the example shown in part (a) of FIG. 6, 2 ECC blocks=32 sectors) is used as a user area. Thus, by substituting a user area for a portion of the first defect substitute area, the usable size of the user area can be guaranteed. Such substitution is achieved by, for example, shifting the position of the sector, to which a logical sector number (LSN) of 0 (i.e., LSN: 0) is assigned, from the user area toward the first defect substitute area, by the size of the user area which is reduced by defect sectors #1 through #5.

The recording and reproduction of data is performed in units of an ECC block (in units of 16 sectors) from a leading end of the user area. At that time, the defect sectors registered in the PDL are skipped.

Next, with reference to FIG. 7, a conventional management method of a defect area detected at the time of recording of user data will be described.

Part (a) of FIG. 7 shows exemplary defect areas detected in zone 0 and zone n (n is an integer of 0 through 34) at the time of recording of user data and substitute areas for substituting for the defect areas.

It is assumed that as shown in part (a) of FIG. 7, two defect sectors (defect sectors #1 and #2) are detected in zone 0 and three defect sectors (defect sectors #3, #4 and #5) are detected in zone n. In this case, substitute block #1 in the first defect substitute area is assigned to defect block #1, and a pair of a PSN of defect block #1 and a PSN of substitute block #1 is registered in SDL entry #1 of the SDL (see part (b) of FIG. 7). Defective blocks #2 through #5 are processed in a similar manner.

Herein, a "defect block" refers to a defect area in units of an ECC block including the defect sector. A "substitute block" refers to a substitute area in units of an ECC block which is usable instead of the defect block.

In the example shown in part (a) of FIG. 7, defect block #1 of zone 0 is substituted for by substitute block #1 in the defect substitute area of the same zone. Accordingly, when a request for recording data in defect block #1 is issued, the data to be recorded in defective block #1 is recorded in substitute block #1. As a result, data recording is completed with no error. In this manner, defect substitution processing is performed by substituting a substitute block for a defect block, so that the medium can behave as if it was error-free even when the user area includes a defect area.

As described above, a defect substitute area is used only for substitution processing for a defect area generated in the user area. The defect substitute area is not used for data storage when no defect area exists. For setting a substitute block address when registering a substitute area in the SDL, a flag with no substitute (part (c) of FIG. 7) is set to 0.

Defect blocks generated in the user area are assigned to the first defect substitute area, sequentially from the end portion thereof. This is for facilitating the selection of a substitute block usable next. When data recording in one substitute block fails, it is attempted to record the data in a block next to the first block. When there is no more usable area in the first defect substitute area (i.e., when there is no empty area in the first defect substitute area), a substitute area exhaustion flag, in the SDL, regarding the first defect substitute area is set. In the case where the second defect substitute area is assigned to the defect substitute area, defects generated thereafter are substituted for by the second defect substitute area.

(Problems to be Solved by the Invention)

As can be seen from the above, when a physically formatted disc is used for recording user data, the number of defect sectors registered in the PDL is initially determined at the time of physical formatting, but the number of defect blocks registered in the SDL may be increased as more defects occur due to fingerprints or dust on the disc. Such an increase in the number of defect blocks registered in the SDL causes, for example, reduction of the execution rate of recording and reproduction and reduction of data reliability.

The number of defect blocks registered in the SDL can be reduced by wiping off the finger prints or dust from the disc and then physically formatting the disc again.

However, physical formatting of a disc requires recording and reproduction of the entire disc, and initialization of the disc is too time-consuming. For example, it requires about one hour to physically format a 4.7 GB disc using a 4.7 GB DVD-RAM drive.

The present invention has an objective of providing an information recording apparatus, an information recording method, and a program for initializing a disc in a short time.

DISCLOSURE OF THE INVENTION

An information recording apparatus, according to the present invention, for recording information on an information recording medium including a user area for recording user data and a defect substitute area including a substitute area usable instead of a defect area in the user area, includes a defect list update section for updating a defect list having a defect address registered therein which represents a position of the defect area in the user area; and a recording section for recording information on the information recording medium based on the updated defect list. The defect list update section determines whether or not an area designated by the defect address registered in the defect list is a defect area, and when the area designated by the defect address is determined not to be a defect area, the defect list update section deletes the defect address, registered in the defect list, from the defect list. By this, the above-described objective is achieved.

The defect list may be a secondary defect list including the defect address representing a position of the defect area detected when recording information on the information recording medium and a substitute address representing a position of the substitute area for substituting for the defect area.

When the area designated by the defect address is determined to be a defect area, the defect list update section may update the defect list such that the substitute address is not assigned to the defect address.

The defect list further may include a flag indicating whether or not the substitute address has been assigned to the defect address, and a state in which the substitute address is not assigned to the defect address may be shown by the flag.

The defect area may be an ECC block including a defect sector, and defect substitution processing of substituting the substitute area for the defect area may be performed in units of an ECC block.

An information recording method, according to the present invention, for recording information on an information recording medium including a user area for recording user data and a defect substitute area including a substitute area usable instead of a defect area in the user area, includes the steps of updating a defect list having a defect address registered therein which represents a position of the defect area in the user area; and recording information on the information recording medium based on the updated defect list. The step of updating the defect list includes the steps of determining whether or not an area designated by the defect address registered in the defect list is a defect area, and when the area designated by the defect address is determined not to be a defect area, deleting the defect address, registered in the defect list, from the defect list. By this, the above-described objective is achieved.

A program according to the present invention is a program for causing an information recording apparatus to execute initialization processing of initializing an information recording medium including a user area for recording user data and a defect substitute area including a substitute area usable instead of a defect area in the user area. The initialization processing includes the step of updating a defect list having a defect address registered therein which represents a position of the defect area in the user area. The step of updating the defect list includes the steps of determining whether or not an area designated by the defect address registered in the defect list is a defect area, and when the area designated by the defect address is determined not to be a defect area, deleting the defect address, registered in the defect list, from the defect list. By this, the above-described objective is achieved.

Another information recording apparatus, according to the present invention, for recording information on an information recording medium including a user area for recording user data and a defect substitute area including a substitute area usable instead of a defect area in the user area, a size of the defect substitute area being variably settable, includes a defect list update section for updating a defect list having a defect address registered therein which represents a position of the defect area in the user area; and a recording section for recording information on the information recording medium based on the updated defect list. The defect list update section determines whether or not at least a part of the defect substitute area is to substitute for the user area, when it is determined that at least the part of the defect substitute area is to substitute for the user area, the defect list update section examines whether or not the part of the defect substitute area which is to substitute for the user area includes a defect area, and the defect list update section registers a defect address, representing a position of the defect area detected by the examination, in the defect list. By this, the above-described objective is achieved.

The defect list may be a secondary defect list including the defect address representing a position of the defect area detected when recording information on the information recording medium and a substitute address representing a position of the substitute area for substituting for the defect area.

The defect list update section may register the defect address so as to provide a state in which the substitute address is not assigned to the defect address.

The defect list further may include a flag indicating whether or not the substitute address has been assigned to the defect address, and a state in which the substitute address is not assigned to the defect address may be shown by the flag.

The defect area may be an ECC block including a defect sector, and defect substitution processing of substituting the substitute area for the defect area may be performed in units of an ECC block.

Another information recording method, according to the present invention, for recording information on an information recording medium including a user area for recording user data and a defect substitute area including a substitute area usable instead of a defect area in the user area, a size of the defect substitute area being variably settable, includes the steps of updating a defect list having a defect address registered therein which represents a position of the defect area in the user area; and recording information on the information recording medium based on the updated defect list. The step of updating the defect list includes the steps of determining whether or not at least a part of the defect substitute area is to substitute for the user area, when it is determined that at least the part of the defect substitute area is to substitute for the user area, examining whether or not the part of the defect substitute area which is to substitute for the user area includes a defect area, and registering the defect address, representing a position of the defect area detected by the examination, in the defect list. By this, the above-described objective is achieved.

A program according to the present invention is a program for causing an information recording apparatus to execute initialization processing of initializing an information recording medium including a user area for recording user data and a defect substitute area including a substitute area usable instead of a defect area in the user area, a size of the defect substitute area being variably settable. The initialization processing includes the step of updating a defect list having a defect address registered therein which represents a position of the defect area in the user area. The step of updating the defect list includes the steps of determining whether or not at least a part of the defect substitute area is to substitute for the user area, when it is determined that at least the part of the defect substitute area is to substitute for the user area, examining whether or not the part of the defect substitute area which is to substitute for the user area includes a defect area, and registering the defect address, representing a position of the defect area detected by the examination, in the defect list. By this, the above-described objective is achieved.

BRIEF DESCRIPTION OF THE DRAWINGS

FIG. 7 illustrates a conventional defect management method of a defect area detected at the time of recording of user data.

BEST MODE FOR CARRYING OUT THE INVENTION

Hereinafter, an example of the present invention will be described with reference to the figures.

Figure 1:
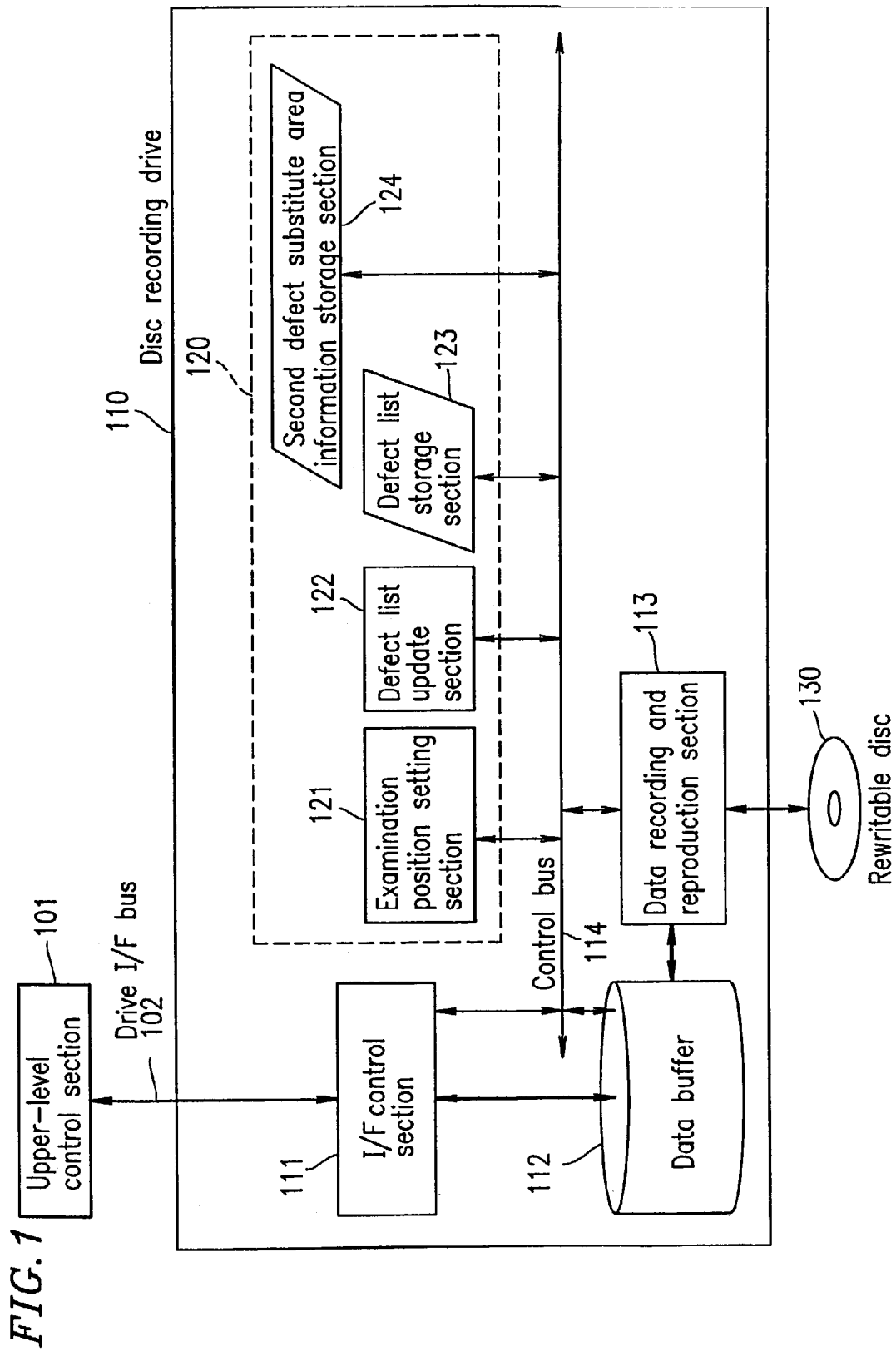
FIG. 1 is a block diagram illustrating a structure of a disc recording drive (information recording apparatus) 110 according to an example of the present invention.

FIG. 1 shows a structure of a disc recording drive (information recording apparatus) 110 according to an example of the present invention.

The disc recording drive 110 is connected to an upper-level control section 101 via a drive I/F bus 102. The upper-level control section 101 is, for example, a personal computer. The drive I/F bus 102 is, for example, a SCSI (Small Computer System Interface), which is a bus for peripherals for personal computers.

The upper-level control section 101 is communicated with the disc recording drive 110 via the drive I/F bus 102, and instructs the disc recording drive 110 to record data on a rewritable disc 130 or to reproduce data recorded on the rewritable disc 130. It is assumed that the rewritable disc 130 basically has the same data structure as that of the disc shown in FIG. 4. The rewritable disc 130 is, for example, a DVD-RAM. Although a rewritable disc will be shown as an example of an information recording medium in the following description, the present invention is applicable to any information recording apparatus and any information recording method for recording information on any type of rewritable disc.

The disc recording drive 110 includes an I/F control section 111 for sending and receiving instructions and data in accordance with a prescribed protocol (for example, a SCSI protocol), a data buffer 112 which is a memory for temporarily storing data to be recorded and data to be reproduced, a data recording and reproduction section 113 for executing recording and reproduction processing to and from the disc 130, and a defect list management section 120 for managing a defect list. The I/F control section 111, the data buffer 112, the data recording and reproduction section 113, and defect list management section 120 are connected to each other via a control bus 114.

Each section included in the disc recording drive 110 may be implemented by software, hardware or a combination of software and hardware.

The defect list management section 120 includes an examination position setting section 121 for setting a position of an area to be examined, a defect list update section 122 for updating the defect list in accordance with the examination result, a defect list storage section 123 for storing a defect list having a defect address registered therein which represents the position of the defect area existing in a user area, and a second defect substitute area information storage section 124 for storing information representing the size of a second defect substitute area.

The data recording and reproduction section 113 acts as a recording section for recording information on the disc 130 based on the defect list updated by the defect list update section 122.

Figure 2:
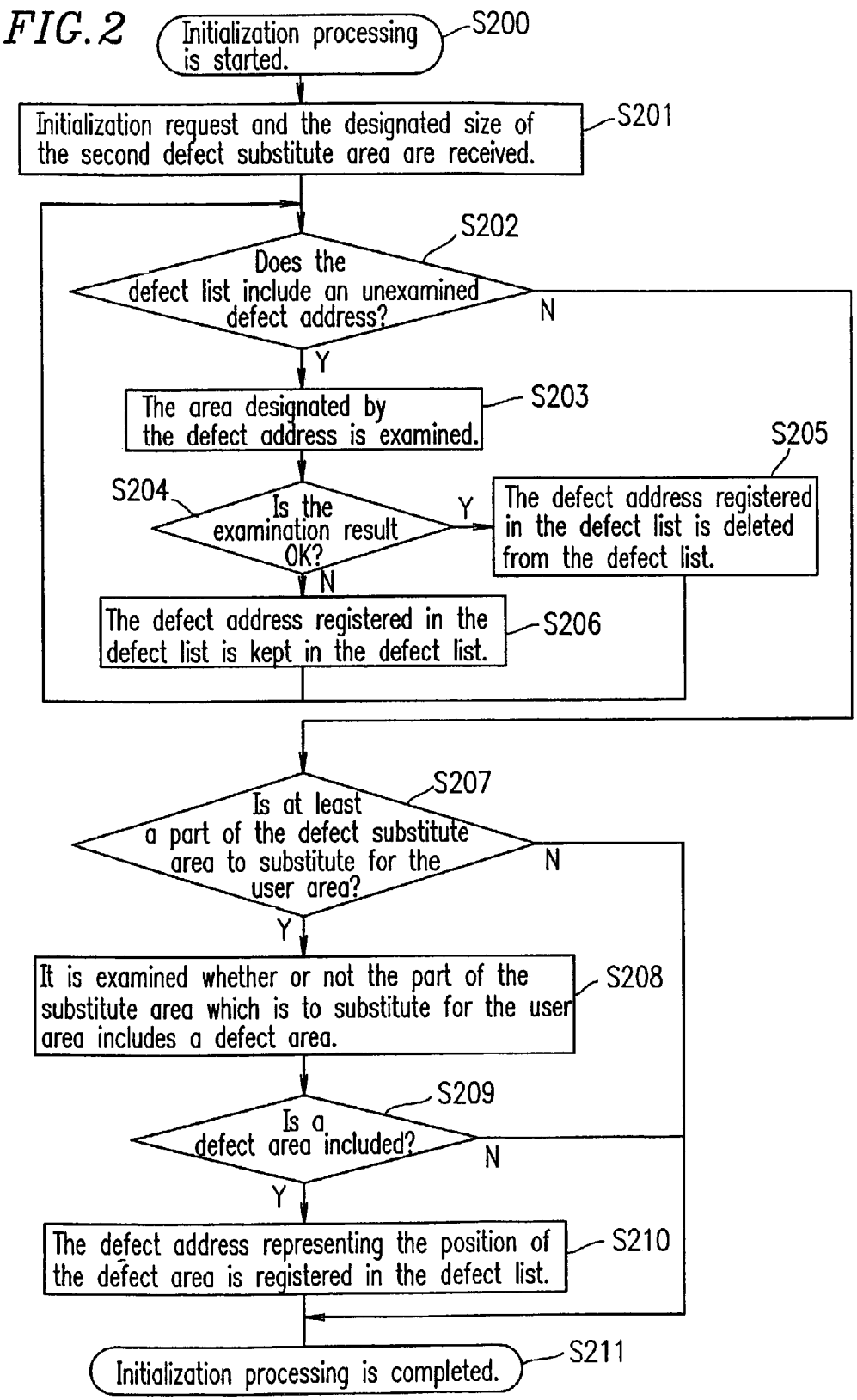
FIG. 2 is a flowchart illustrating a flow of initialization processing for initializing a disc 130.

FIG. 2 illustrates a flow of initialization processing for initializing the disc 130. A program for causing the disc recording drive 110 to execute the initialization processing may be provided. Such a program may be stored in, for example, a memory (not shown) in the disc recording drive 110. Such a program may be, for example, executed by a processor (not shown) in the disc recording drive 110 in response to an initialization request from the upper-level control section 101.

Step S201: The I/F control section 111 receives an initialization request of "initialize the disc 130" and a designated size of the second defect substitute area from the upper-level control section 101, and instructs the examination position setting section 121 to initialize the disc 130.

Step S202: The examination position setting section 121 refers to the defect list stored in the defect list storage section 123 to determine whether or not there is a defect address (address representing the position of a defect area) registered in the defect list.

Step S203: When there is a defect address registered in the defect list, the data recording and reproduction section 113 is instructed to examine the area designated by the defect address (for example, an area of 1 ECC block starting from the sector designated by the defect address). The examination result provided by the data recording and reproduction section 113 is transferred to the defect list update section 122.

The examination in step S203 is achieved by, for example, recording prescribed data in an area to be examined, then reproducing the data, and determining whether or not the recorded data matches the reproduced data.

Step S204: The defect list update section 122 determines the result of the examination in step S203. When the result of the examination is determined to be "OK" (i.e., when the area designated by the defect address is determined not to be a defect address), the processing advances to step S205. When the result of the examination is determined to be "NG" (i.e., when the area designated by the defect address is determined to be a defect address), the processing advances to step S206.

Step S205: The defect list update section 122 deletes the defect address, registered in the defect list, from the defect list.

Step S206: The defect list update section 122 keeps the registered defect address, registered in the defect list, in the defect list.

Steps S203 through S206 are repeated until the examination is completed on all the defect addresses registered in the defect list (step S202).

In this manner, the defect list is updated. The update processing of the defect list is performed based on the technological idea that "an area designated by a defect address registered in the defect list is examined; and when the area as a target of examination is confirmed not to be a defect area, the defect address is deleted from the defect list". Thus, when an area of the disc is recovered from the defective state by wiping off the fingerprint or dust on the disc, such recovery can be reflected on the defect list.

As described above, the disc 130 is initialized by updating the defect list. The initialization processing eliminates the need for data recording and reproduction being performed on the entire disc 130, unlike the case of the initialization of the disc 130 by physical formatting. As a result, as compared to the initialization of the disc 130 by physical formatting, the disc 130 can be initialized in a significantly shorter time.

The defect list is typically a secondary defect list (SDL) including a defect address representing the position of a defect area detected when the data is recorded on the disc 130 and a substitute address representing the position of the substitute area for substituting for the defect area. However, the defect list is not limited to an SDL. As far as the defect address representing the position of the defect area can be registered in the defect list, the defect list may have any data structure.

The defect area may be an ECC block including the defect sector. In this case, defect substitution processing for substituting the substitute area for the defect area is executed in units of an ECC block.

It is assumed that the defect list is an SDL. In this case, when the area designated by the defect address is determined to be a defect area, the defect list update section 122 preferably updates the SDL such that the substitute address is not assigned to the defect address. The SDL is updated in this manner, so that a new substitute address can be assigned to the defect address when actually recording data on the disc 130. As a result, the defect substitute area can be used effectively with no waste.

In the case where the SDL includes a flag indicating whether or not the substitute address has been assigned to the defect address, the flag may be set to a specific value (for example, 1) so as to show the "state in which the substitute address is not assigned to the defect address". In the case of the "state in which the substitute address is not assigned to the defect address", the value of the substitute address may be set to an arbitrary value. The reason is that, in this case, the value of the substitute address is not referred to. Nevertheless, the value of the substitute address may be set to 0. Alternatively, the "state in which the substitute address is not assigned to the defect address" may be shown by setting the value of the substitute address to a specific value (for example, 0) without using the above-mentioned flag. In this case, the need for providing an area for storing the flag in the SDL is eliminated.

Step S207. The defect list update section 122 determines whether or not at least a part of the defect substitute area, the size of which can be variably set (in the example shown in FIG. 4, the second defect substitute area) is to substitute for the user area, as the initialization processing of the disc 130 progresses.

Figure 4:
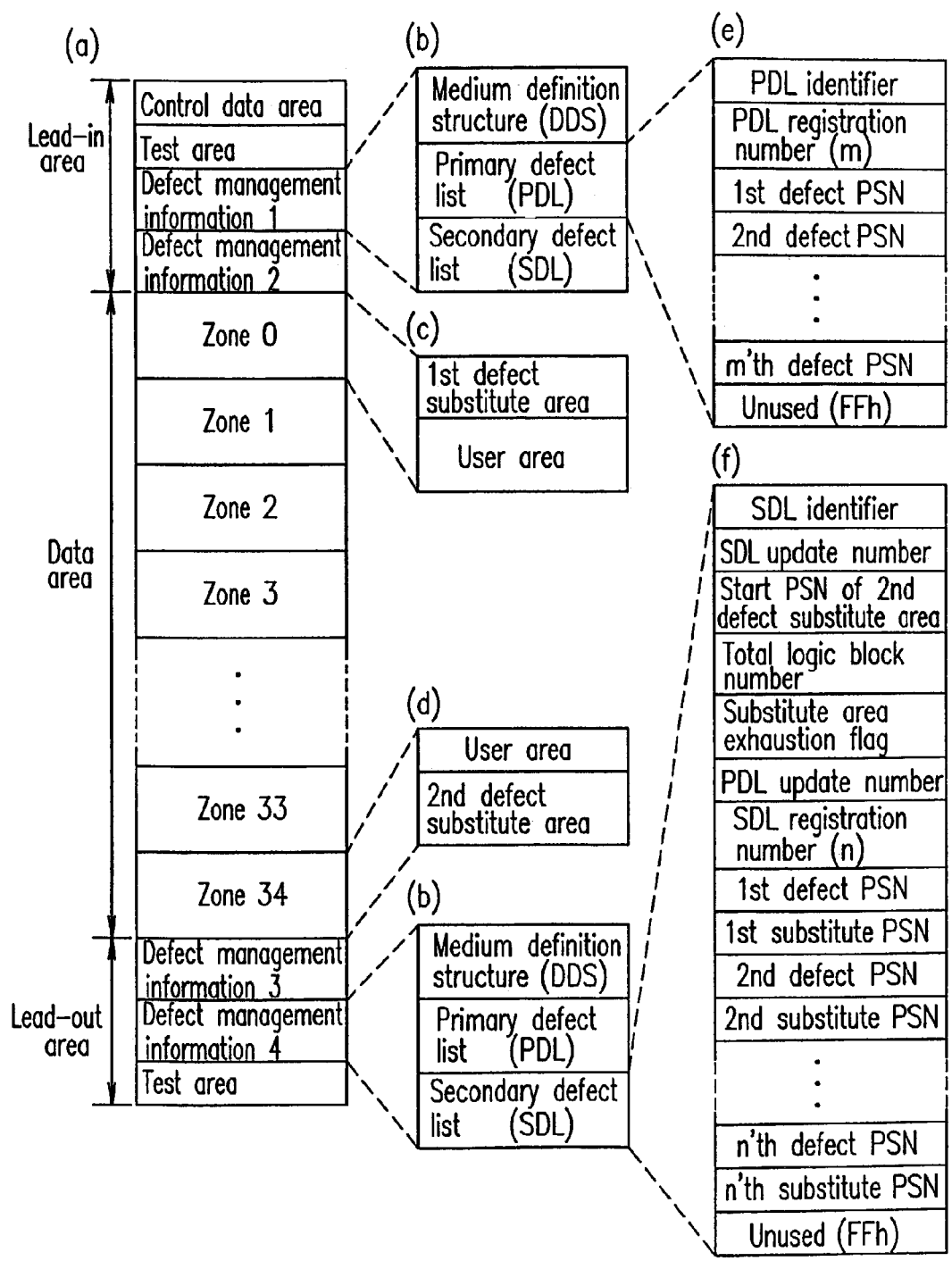
FIG. 4 shows a data structure of a conventional rewritable disc.
Figure 5:
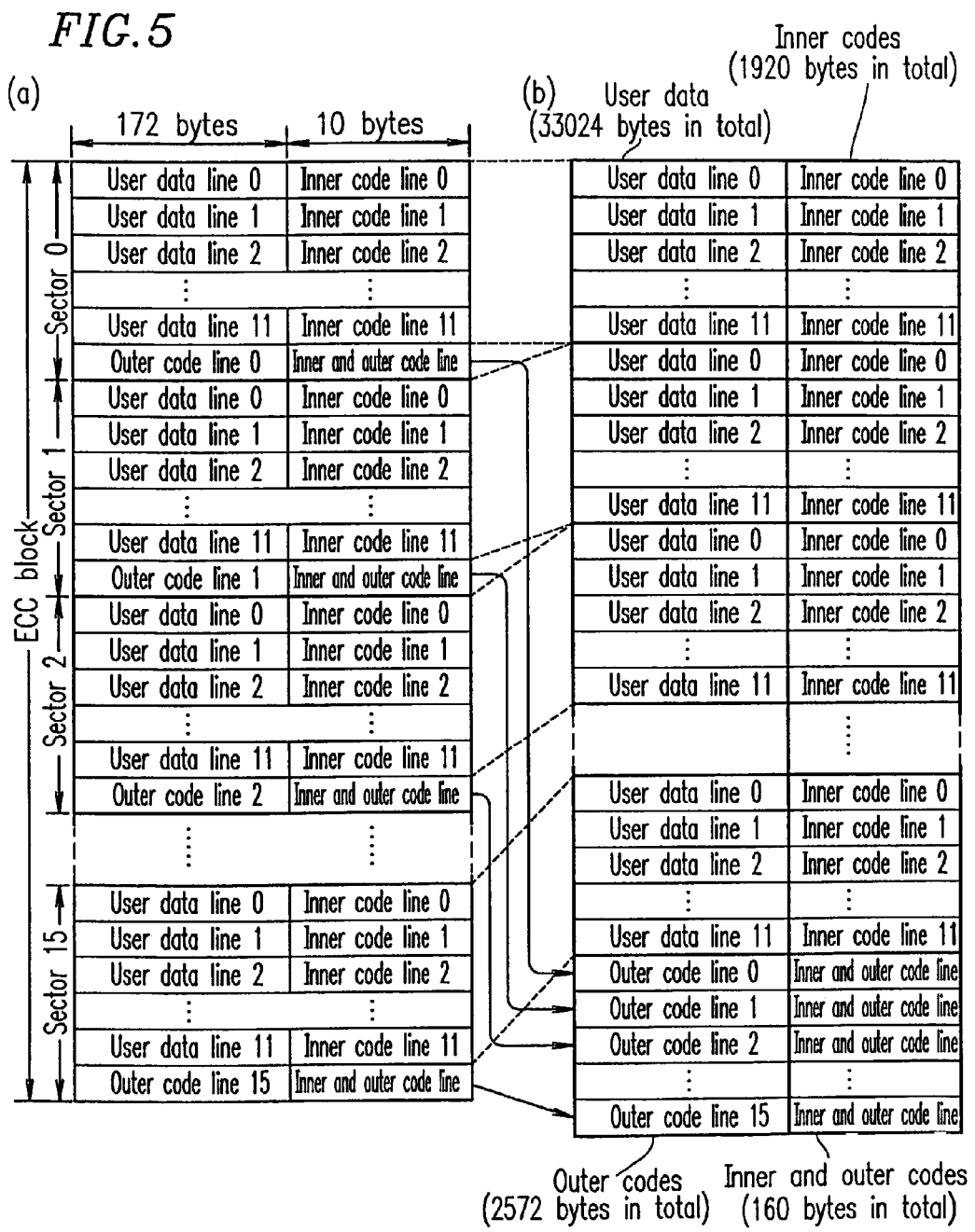
FIG. 5 illustrates an ECC block.
Figure 6:
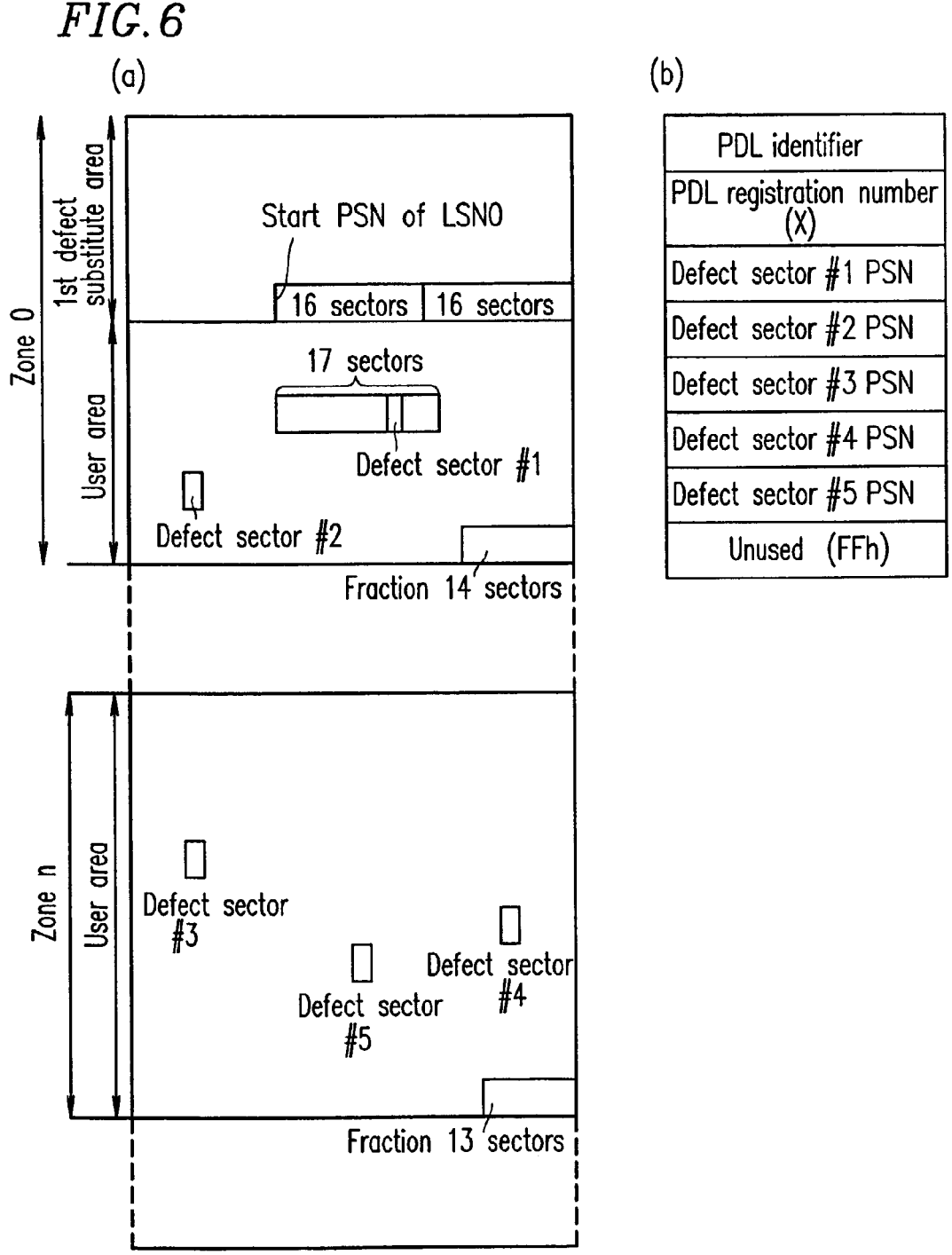
FIG. 6 illustrates a conventional defect management method of a defect area detected at the time of physical formatting.

Such a determination is achieved by, for example, comparing the size of the second defect substitute area (Size 1) designated by the initialization request issued by the upper-level control section 101, and the size of the current second defect substitute area (Size 2). The size of the current second defect substitute area is obtained by referring to the information stored in the second defect substitute area information storage section 124. Alternatively, the size of the current second defect substitute area may be calculated based on the information recorded at the "start PSN of the second defect substitute area" in the SDL (FIG. 4).

When Size 1<Size 2, the defect list update section 122 determines that at least a part of the defect substitute area is to substitute for a user area. As a result, the processing advances to step S208.

When Size 1≧Size 2, the defect list update section 122 determines that no part of the defect substitute area is to substitute for a user area. As a result, the processing advances to step S211, where the initialization processing is completed.

Step S208: The defect list update section 122 instructs the data recording and reproduction section 113 to examine whether or not a portion of the defect substitute area, which can be substituted for by the user area, includes a defect area. The examination result provided by the data recording and reproduction section 113 is transferred to the defect list update section 122.

The examination in step S208 is achieved by, for example, recording prescribed data in an area to be examined, then reproducing the data, and determining whether or not the recorded data matches the reproduced data.

Step S209: The defect list update section 122 makes a determination on the result of the examination in step S208. When it is determined that the portion of the defect substitute area, which can be substituted for by the user area, includes a defect area, the processing advances to step S210. When it is determined that the portion does not include a defect area, the processing advances to step S211, where the initialization processing is completed.

Step S210: The defect list update section 122 registers a defect address, representing the position of the defect area defected by the examination in step S208, in the defect list.

The defect list is updated as in steps S207 through S210, so that a defect address, representing the position of a defect area which exists in the defect substitute area but is not registered in the defect list, can now be registered in the defect list.

In the case where the defect list is SDL and the portion of the defect substitute area, which can be substituted for by the user area, includes a defect area, the defect list update area 122 preferably updates the SDL such that the substitute address is not assigned to the defect address representing the position of the defect area. The SDL is updated in this manner, so that a new substitute address can be assigned to the defect address when actually recording data on the disc 130. As a result, the defect substitute area can be used effectively with no waste.

In the case where the SDL includes a flag indicating whether or not the substitute address has been assigned to the defect address, the flag may be set to a specific value (for example, 1) so as to show the "state in which the substitute address is not assigned to the defect address". The value of the substitute address may be set to 0.

Next, with reference to FIG. 3, how the defect list is updated in accordance with the initialization processing shown in FIG. 2 will be described. In this example, the defect list is an SDL.

Figure 3:
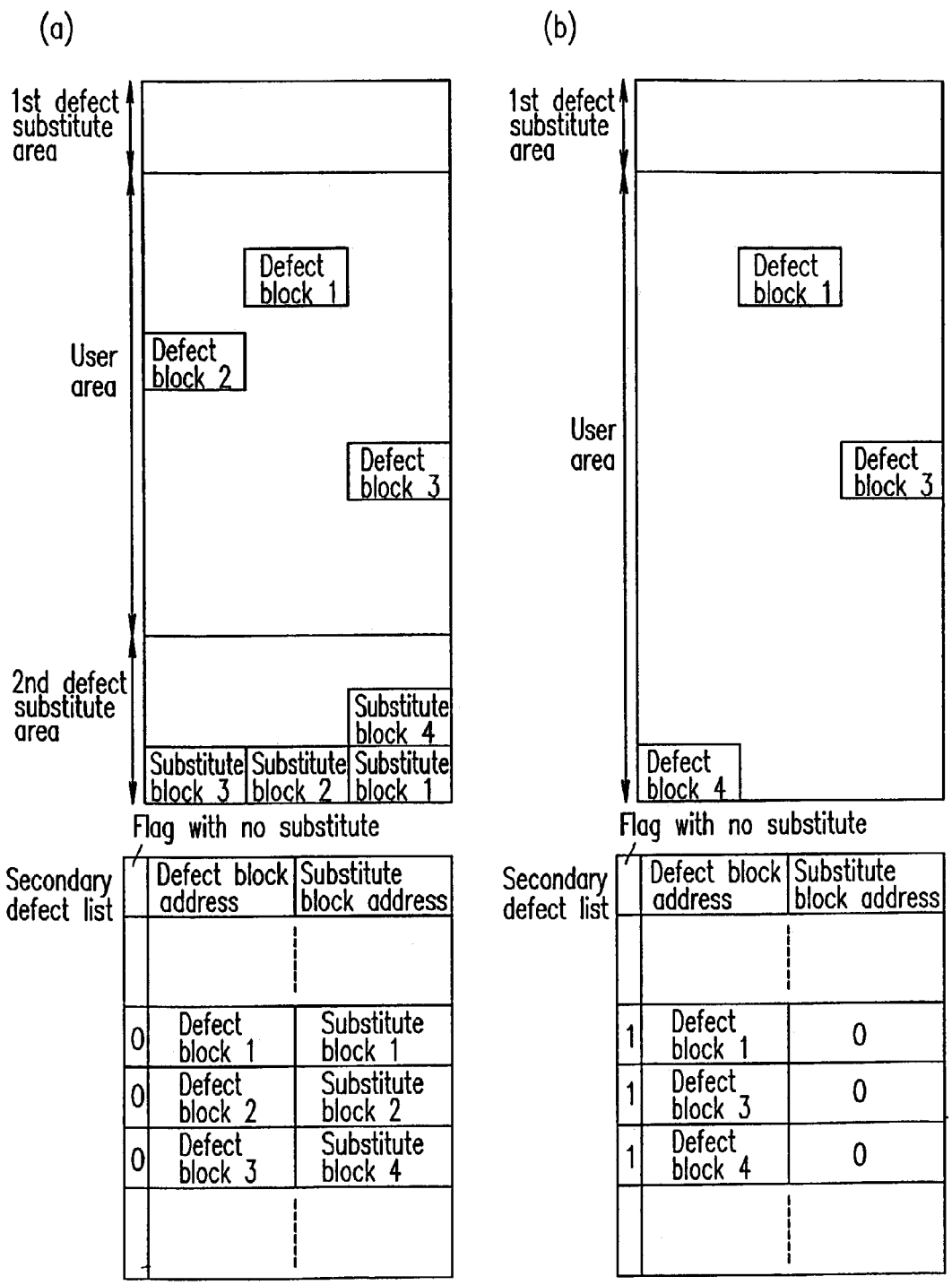
FIG. 3 shows specific examples of a defect list updated in accordance with the initialization processing shown in FIG. 2.

Part (a) of FIG. 3 shows a state of the disc 130 and the SDL before the SDL is updated. Part (b) of FIG. 3 shows a state of the disc 130 and the SDL after the SDL is updated. It is assumed that the initialization processing of the SDL initializes the disc 130 from the state shown in part (a) of FIG. 3, in which the second defect substitute area is included, to the state shown in part (b) of FIG. 3, in which the second defect substitute area is not included.

In the state before the SDL is updated (part (a) of FIG. 3), it is assumed as follows: defect block 1 is substituted for by substitute block 1, defect block 2 is substituted for by substitute block 2, and defect substitution processing for substituting substitute block 3 for defect block 3 failed; and as a result, defect block 3 is substituted for by substitute block 4. It is also assumed that the defect state of the disc 130 has been changed by the surface of the disc 130 being cleaned or the like, and thus defect block 2 has become a normal block.

Under such conditions, the initialization processing shown in FIG. 2 is executed. Then, defect blocks designated by defect block addresses registered in the SDL are sequentially examined. As a result, the address of defect block 1 and the address of defect block 3 remain in the SDL, whereas the address of defect block 2 is deleted from the SDL. The reason is that defect blocks 1 and 3 are still defect blocks, but defect block 2 has become a normal block.

Then, it is examined whether or not a portion of the second defect substitute area which can be substituted for by a user area (in the example shown in FIG. 3, the entirety of the second defect substitute area) includes a defect area. As a result, substitute block 3 shown in part (a) of FIG. 3 is detected as a defect block. Thus, substitute block 3 is registered as defect block 4 in the SDL (part (b) of FIG. 3).

In the example shown in part (b) of FIG. 3, the value of the flag with no substitute corresponding to defect blocks 1, 3 and 4 is set to 1, and the value of the substitute block address is set to 0. Herein, the "flag with no substitute" refers to a flag which indicates whether or not a substitute block address has been assigned to the defect block address. The value of 0 of the flag with no substitute indicates that a substitute block address has been assigned to the defect block address, and the value of 1 of the flag with no substitute indicates that the substitute block address is assigned to the defect block address.

In the example shown in FIG. 3, the data area includes a first defect substitute area having a fixed size and a second defect substitute area, the size of which can be variably set. The number of defect substitute areas included in the data area and the arrangement of the defect substitute areas are not limited to those shown in FIG. 3. As far as a data area includes at least one defect substitute area, the size of which can be variably set, the present invention is applicable to any information recording apparatus and any information recording method for recording data on an arbitrary information recording medium including such a data area.

In the above example of the present invention, blocks are examined by data comparison using recording and reproduction. The examination may be performed by simply reproducing data from the block.

INDUSTRIAL APPLICABILITY

According to an information recording apparatus of the present invention, the information recording medium can be initialized by merely updating a defect list. This initialization processing eliminates the need for data recording and reproduction being performed on the entire information recording medium, unlike the case of initialization of an information recording medium by physical formatting. As a result, as compared to the initialization of the information recording medium by physical formatting, the information recording medium can be initialized in a significantly shorter time.

According to an information recording apparatus of the present invention, a secondary defect list can be updated such that the substitute address is not assigned to a defect address in a secondary defect list. The secondary defect list is updated in this manner, so that a new substitute address can be assigned to the defect address when actually recording data on the information recording medium. As a result, the defect substitute area can be used effectively with no waste.

According to an information recording apparatus of the present invention, in the case where a portion of the defect substitute area, which can be substituted for by a user area, includes a defect area, a defect address representing the position of the defect area is registered in the defect list. As a result, a defect address, representing the position of a defect area which exists in the defect substitute area but is not registered in the defect list, can now be registered in the defect list.

An information recording method and a program according to the present invention provide substantially the same effects as those described above.

What is claimed is:

1. An information recording apparatus for recording information on an information recording medium including a user area for recording user data and a defect substitute area including a substitute area usable instead of a defect area in the user area, the information recording apparatus comprising:
   a defect list update section for updating a defect list having a defect address registered therein which represents a position of the defect area in the user area; and
   a recording section for recording information on the information recording medium based on the updated defect list,
   wherein:
   the defect list is a secondary defect list including the defect address representing a position of the defect area detected when recording information on the information recording medium and a substitute address representing a position of the substitute area for substituting for the defect area,
   the defect list update section determines whether or not an area designated by the defect address registered in the defect list is a defect area,
   when the area designated by the defect address is determined not to be a defect area, the defect list update section deletes the defect address, registered in the defect list, from the defect list, and
   when the area designated by the defect address is determined to be a defect area, the defect list update section updates the defect list such that the substitute address is not assigned to the defect address.

2. An information recording apparatus according to claim 1, wherein the defect list further includes a flag indicating whether or not the substitute address has been assigned to the defect address, and a state in which the substitute address is not assigned to the defect address is shown by the flag.

3. An information recording apparatus according to claim 1, wherein the defect area is an ECC block including a defect sector, and defect substitution processing of substituting the substitute area for the defect area is performed in units of an ECC block.

4. An information recording method for recording information on an information recording medium including a user area for recording user data and a defect substitute area including a substitute area usable instead of a defect area in the user area, the information recording method comprising the steps of:
   updating a defect list having a defect address registered therein which represents a position of the defect area in the user area; and
   recording information on the information recording medium based on the updated defect list,
   wherein:
   the defect list is a secondary defect list including the defect address representing a position of the defect area detected when recording information on the information recording medium and a substitute address representing a position of the substitute area for substituting for the defect area, and
   the step of updating the defect list includes the steps of:
      determining whether or not an area designated by the defect address registered in the defect list is a defect area,
      when the area designated by the defect address is determined not to be a defect area, deleting the defect address, registered in the defect list, from the defect list, and
      when the area designated by the defect address is determined to be a defect area, updating the defect list such that the substitute address is not assigned to the defect address.

5. A program for causing an information recording apparatus to execute initialization processing of initializing an information recording medium including a user area for recording user data and a defect substitute area including a substitute area usable instead of a defect area in the user area, wherein the initialization processing includes the step of:
   updating a defect list having a defect address registered therein which represents a position of the defect area in the user area; and
   wherein:
   the defect list is a secondary defect list including the defect address representing a position of the defect area detected when recording information on the information recording medium and a substitute address representing a position of the substitute area for substituting for the defect area, and
   the step of updating the defect list includes the steps of:
      determining whether or not an area designated by the defect address registered in the defect list is a defect area,
      when the area designated by the defect address is determined not to be a defect area, deleting the defect address, registered in the defect list, from the defect list, and
      when the area designated by the defect address is determined to be a defect area, updating the defect list such that the substitute address is not assigned to the defect address.

6. An information recording apparatus for recording information on an information recording medium including a user area for recording user data and a defect substitute area including a substitute area usable instead of a defect area in the user area, a size of the defect substitute area being variably settable, the information recording apparatus comprising:
   a defect list update section for updating a defect list having a defect address registered therein which represents a position of the defect area in the user area; and
   a recording section for recording information on the information recording medium based on the updated defect list,
   wherein:
   the defect list update section determines whether or not at least a part of the defect substitute area is to substitute for the user area, based on a comparison result of the size of the defect substitute area and a size of a defect substitute area designated by an initialization request, when it is determined that at least the part of the defect substitute area is to substitute for the user area, the defect list update section substitutes the user area for at least the part of the defect substitute area so as to expand the size of the user area, and examines whether or not the part of the defect substitute area which is to substitute for the user area includes a defect area, and the defect list update section registers a defect address, representing a position of the defect area detected by the examination, in the defect list.

7. An information recording apparatus according to claim 6, wherein the defect list is a secondary defect list including the defect address representing a position of the defect area detected when recording information on the information recording medium and a substitute address representing a position of the substitute area for substituting for the defect area.

8. An information recording apparatus according to claim 7, wherein the defect list update section registers the defect address so as to provide a state in which the substitute address is not assigned to the defect address.

9. An information recording apparatus according to claim 8, wherein the defect list further includes a flag indicating whether or not the substitute address has been assigned to the defect address, and a state in which the substitute address is not assigned to the defect address is shown by the flag.

10. An information recording apparatus according to claim 6, wherein the defect area is an ECC block including a defect sector, and defect substitution processing of substituting the substitute area for the defect area is performed in units of an ECC block.

11. An information recording method for recording information on an information recording medium including a user area for recording user data and a defect substitute area including a substitute area usable instead of a defect area in the user area, a size of the defect substitute area being variably settable, the information recording method comprising the steps of:

updating a defect list having a defect address registered therein which represents a position of the defect area in the user area; and recording information on the information recording medium based on the updated defect list, wherein the step of updating the defect list includes the steps of:

determining whether or not at least a part of the defect substitute area is to substitute for the user area, based on a comparison result of the size of the defect substitute area and a size of a defect substitute area designated by an initialization request, when it is determined that at least the part of the defect substitute area is to substitute for the user area, substituting the user area for at least the part of the defect substitute area so as to expand the size of the user area, and examining whether or not the part of the defect substitute area which is to substitute for the user area includes a defect area, and registering the defect address, representing a position of the defect area detected by the examination, in the defect list.

12. A program for causing an information recording apparatus to execute initialization processing of initializing an information recording medium including a user area for recording user data and a defect substitute area including a substitute area usable instead of a defect area in the user area, a size of the defect substitute area being variably settable, wherein the initialization processing includes the step of:

updating a defect list having a defect address registered therein which represents a position of the defect area in the user area; and the step of updating the defect list includes the steps of:

determining whether or not at least a part of the defect substitute area is to substitute for the user area, based on a comparison result of the size of the defect substitute area and a size of a defect substitute area designated by an initialization request, when it is determined that at least the part of the defect substitute area is to substitute for the user area, substituting the user area for at least the part of the defect substitute area so as to expand the size of the user area, and examining whether or not the part of the defect substitute area which is to substitute for the user area includes a defect area, and registering the defect address, representing a position of the defect area detected by the examination, in the defect list.

* * * * *

UNITED STATES PATENT AND TRADEMARK OFFICE
CERTIFICATE OF CORRECTION

PATENT NO. : 6,978,404 B2
DATED : December 20, 2005
INVENTOR(S) : Hiroshi Ueda et al.

It is certified that error appears in the above-identified patent and that said Letters Patent is hereby corrected as shown below:

<u>Title page,</u>
Item [54], Title, "DEVICE" should read -- APPARATUS --; and
Item [56], References Cited, FOREIGN PATENT DOCUMENTS, "12/1993, 5/1995 and 8/2000" should read -- 5/1993, 9/1995 and 2/2000 --.

Signed and Sealed this

Twenty-first Day of March, 2006

JON W. DUDAS
*Director of the United States Patent and Trademark Office*